United States Patent [19]

Aminighazvini

[11] Patent Number: 5,277,585

[45] Date of Patent: Jan. 11, 1994

[54] WATERFLOW TEACHING TERRAIN MODEL HAVING ICE STORAGE CHAMBER

[76] Inventor: Alinaghi Aminighazvini, 151 Coolidge Ave., Unit 308, Watertown, Mass. 02172

[21] Appl. No.: 47,029

[22] Filed: Apr. 16, 1993

[51] Int. Cl.⁵ ............................................. G09B 25/06
[52] U.S. Cl. .................................. 434/126; 434/151; 434/150; 434/152; 434/389
[58] Field of Search ............... 434/126, 150, 151, 152, 434/299, 276, 380, 389

[56] References Cited

U.S. PATENT DOCUMENTS

| | | |
|---|---|---|
| 1,278,632 | 9/1918 | Gerashshenevsky . |
| 1,600,163 | 9/1926 | Burns . |
| 1,922,055 | 8/1933 | Marx . |
| 2,185,689 | 1/1940 | Jensen ................................. 434/152 |
| 2,697,286 | 12/1954 | Miller ................................. 434/299 |
| 3,426,540 | 2/1969 | Fixel . |
| 3,431,735 | 3/1969 | Stauber . |
| 3,475,834 | 11/1969 | Bugg ................................. 434/126 |
| 3,751,827 | 8/1973 | Gaskin . |
| 4,363,564 | 12/1982 | Borgren . |

FOREIGN PATENT DOCUMENTS

| | | | |
|---|---|---|---|
| 1399805 | 5/1988 | U.S.S.R. ............................ | 434/299 |
| 0551508 | 2/1943 | United Kingdom .............. | 434/152 |
| 2236889 | 4/1991 | United Kingdom .............. | 434/152 |

Primary Examiner—John J. Wilson
Assistant Examiner—Jeffrey A. Smith
Attorney, Agent, or Firm—Richard C. Litman

[57] ABSTRACT

A topographical model simulates mountains having stream beds, a river valley, a dam creating a lake therebehind, and a cultivated field. A chamber formed in the top of the mountain is charged with ice, which melts and escapes to the stream bed. A diverter selectively directs this water to the lake or to a dry side of the mountain, thus influencing water level of the lake and the river. The dam includes a simulated hydroelectric generator and a simulated irrigation system delivering water from the lake to the cultivated field. A secondary dam is provided to trap spillage from the main dam. A trench and optional surface screen protect the lake from floating or submerged debris. The model thus demonstrates that portion of a natural water cycle originating with snow melting on mountains, and exploitation of water resources to generate power and to irrigate a cultivated field.

11 Claims, 4 Drawing Sheets

WATERFLOW TEACHING TERRAIN MODEL HAVING ICE STORAGE CHAMBER

BACKGROUND OF THE INVENTION

1. Field of the Invention

The present invention relates to a three dimensional model used to teach aspects of natural water cycle flow and artificial exploitation of water flow, as for power generation and irrigation.

2. Description of the Prior Art

Models of real topographical formations and water bodies are known. Exemplary are U.S. Pat. Nos. 1,278,632, issued to M. Gerashshenevsky on Sep. 10, 1918 and 3,751,827, issued on Aug. 14, 1973 to T. A. Gaskin. These models are generally static displays not employing water to act thereupon, and generally are directed to natural phenomena, and do not illustrate harnessing of water resources.

Of course, water resources are harnessed to produce electrical power and to provide potable water, among other purposes, as evidenced by U.S. Pat. Nos. 1,600,163, issued to J. Burns on Sep. 14, 1926, 1,922,055, issued to K. F. Marx on Aug. 15, 1933, 3,426,540, issued to A. E. Fixel on Feb. 11, 1969, 3,431,735, issued to H. Stauber on Mar. 11, 1969, and 4,363,564, issued to P. M. Borgren on Dec. 14, 1982.

None of the above inventions and patents, taken either singly or in combination, is seen to describe the instant invention as claimed.

SUMMARY OF THE INVENTION

A topographical model simulates mountains having stream beds, a river valley, a dam creating a lake therebehind, and a cultivated field. A chamber formed in the top of the mountain has an opening communicating with the stream bed, and is charged with ice, which melts and escapes to the stream bed. The stream bed forks, one fork leading to the river and the other away therefrom. A diverter selectively directs this water at the fork to flow to the lake or to a dry side of the mountain, thus influencing water level of the lake and the river.

The dam includes a simulated hydroelectric generator and a simulated irrigation system delivering water from the lake to the cultivated field. The irrigation system includes a valve controlling water flow to the cultivated field.

Debris is prevented from entering the lake by a depression defining the beginning of the lake, in which debris collects and from which debris is periodically removed. A screen guarding against floating debris is optionally provided.

A further safety feature is a secondary dam for coping with overflow or escaping water, as due to a partial collapse. The secondary dam is downstream from the main dam.

The model thus demonstrates that portion of a natural water cycle originating with snow melting on mountains, and exploitation of water resources to generate power and to irrigate a cultivated field.

Accordingly, it is a principal object of the invention to provide a three dimensional topological model demonstrating a mountain providing a water source, a river being formed from water flowing from the water source, a dam, and a lake defined upstream from the dam.

It is another important object of the invention to provide a three dimensional topological model demonstrating a partial water cycle and operating by melting of ice placed therein.

It is a further object of the invention to provide a three dimensional topological model demonstrating hydroelectric power generation.

A further object of the invention to provide a three dimensional topological model demonstrating modulation of water level in a dam and a river.

Still another object of the invention is to provide a three dimensional topological model demonstrating irrigation of a cultivated field.

Yet another object of the invention is to provide debris entrapment to protect the lake.

An additional object is to provide a secondary dam providing for retention of unexpected or overly great flow past the dam.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
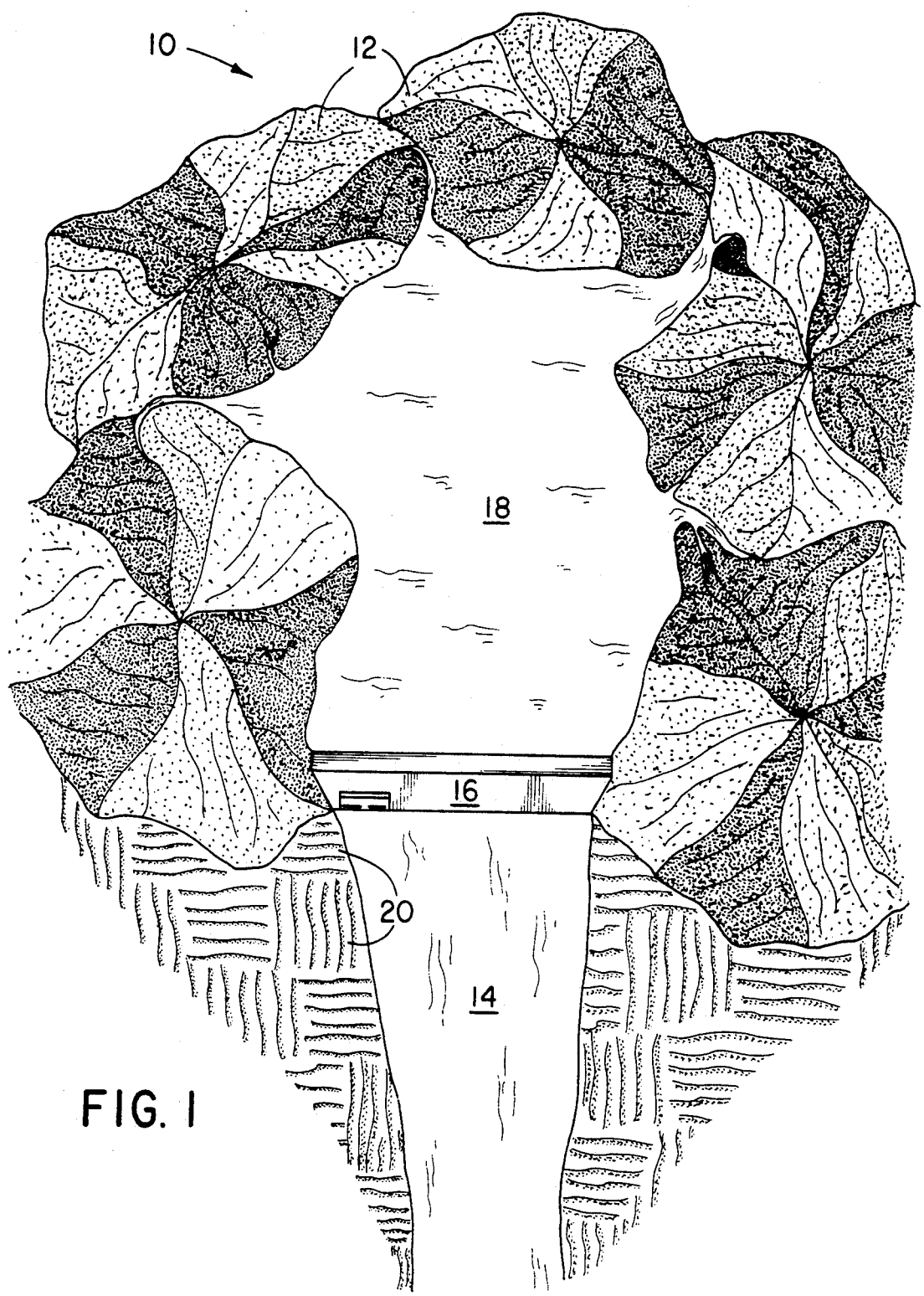
FIG. 1 is a top plan view of the topographical model of the present invention.

The topographical model 10 of the present invention, seen in top plan view in FIG. 1, includes three dimensional, simulated mountains 12, river 14, dam 16, lake 18, and a cultivated field 20. The mountains 12 and dam 16 are preferably water impermeable. The cultivated field 20 is mildly water permeable, so that water deposited thereupon remains visible for a short period of time, then dissipates thereinto, and ultimately drains into the river 14.

Figure 2:
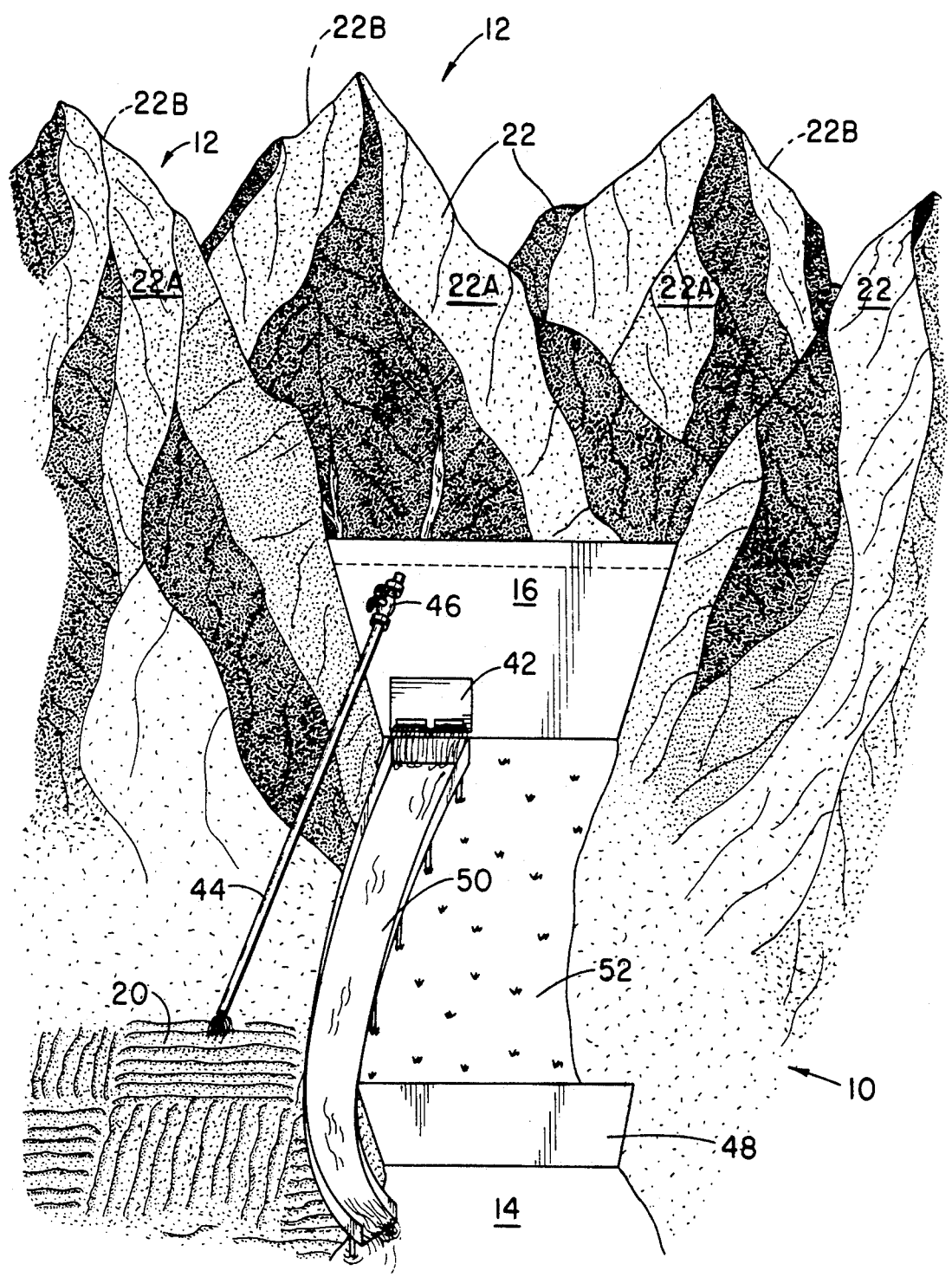
FIG. 2 is a perspective front detail view of the dam of the topographical model, drawn to enlarged scale.
Figure 3:
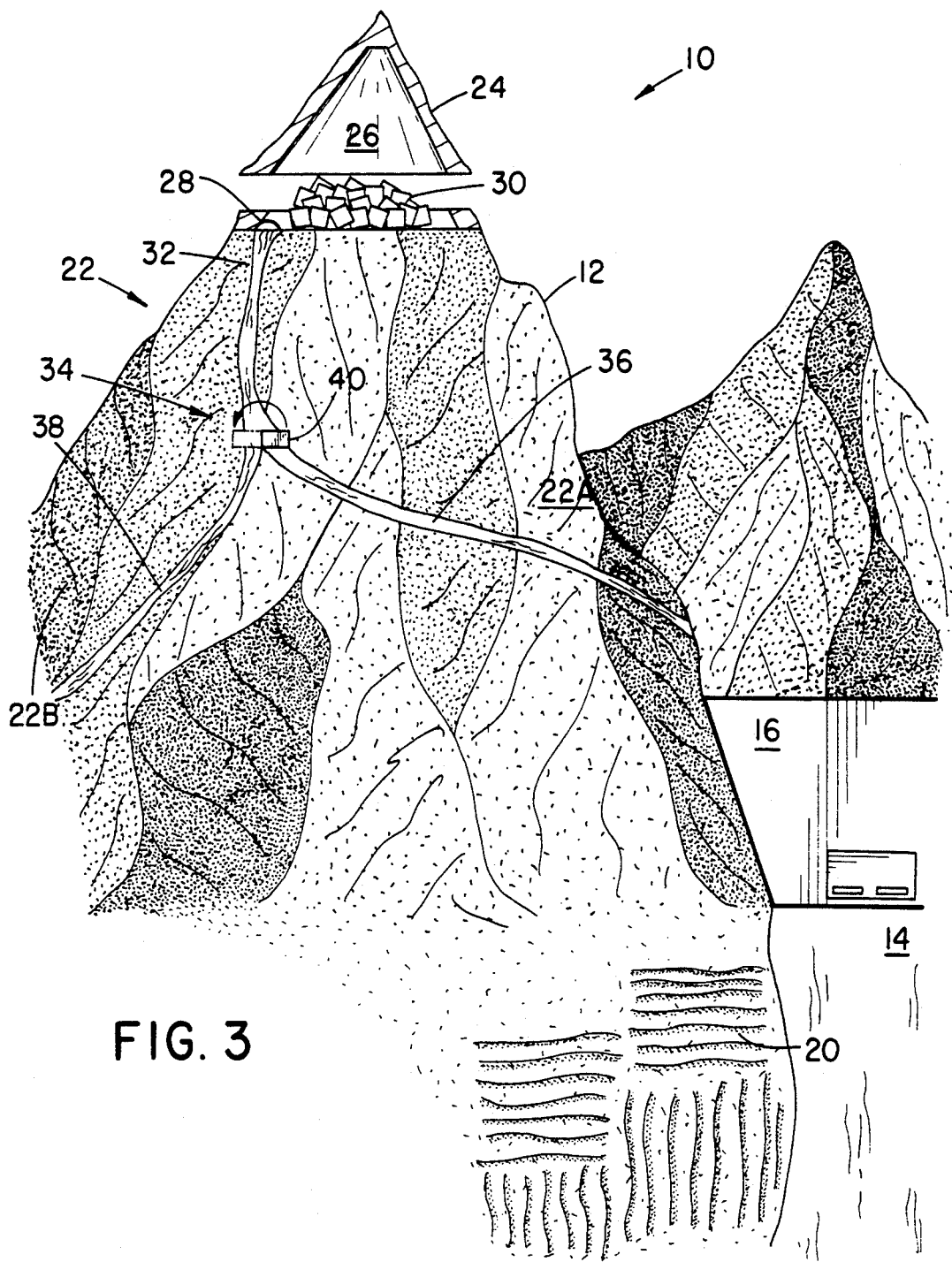
FIG. 3 is a side elevational detail view of a mountain from the topographical model, shown substantially in cross section, and drawn to enlarged scale.

Referring now to FIG. 2, each mountain 12 includes steep sides 22, at least one side 22A facing the river 14 and one side 22B facing away therefrom. The mountain cap 24 is removable to reveal a chamber 26 having a port 28 leading to an exterior mountain surface. The chamber is charged with ice 30, which, for teaching purposes, simulates snow and the like naturally deposited on mountains. The ice 30 melts, and gathers in chamber 26. Water then flows through port 28 to a stream bed 32 formed in the mountain side 22. Seen best in FIG. 3, the stream bed 32 forks, shown generally at 34, one resultant stream 36 flowing toward the river 14 or the lake 18, and the other resultant stream 38 leading toward a side 22B of the mountain 12 facing away from the river 14. A gate 40 diverts water from one of the two streams 36 or 38 to the other, so that students may note the effect upon water level in the lake 18 or river 14, and thus consider the implications of water diversion.

Turning again to FIG. 2, the dam 16 includes a simultated hydroelectric generator 42, which turns in response to volume and head of water flow through the dam 16, which are both responsive to the amount of water that has accumulated in the lake 18.

The dam 16 also includes a small pipe 44 leading to a simulated cultivated field 20. A manual valve 46 enables students to control water flow to the cultivated field 20.

A secondary dam 48 allows for retention of excess water flowing past dam 16. An elevated waterway 50 routes water discharged from the hydroelectric generator 42 past a dry area 52 which is reserved for retention of excess water behind secondary dam 48.

Figure 4:
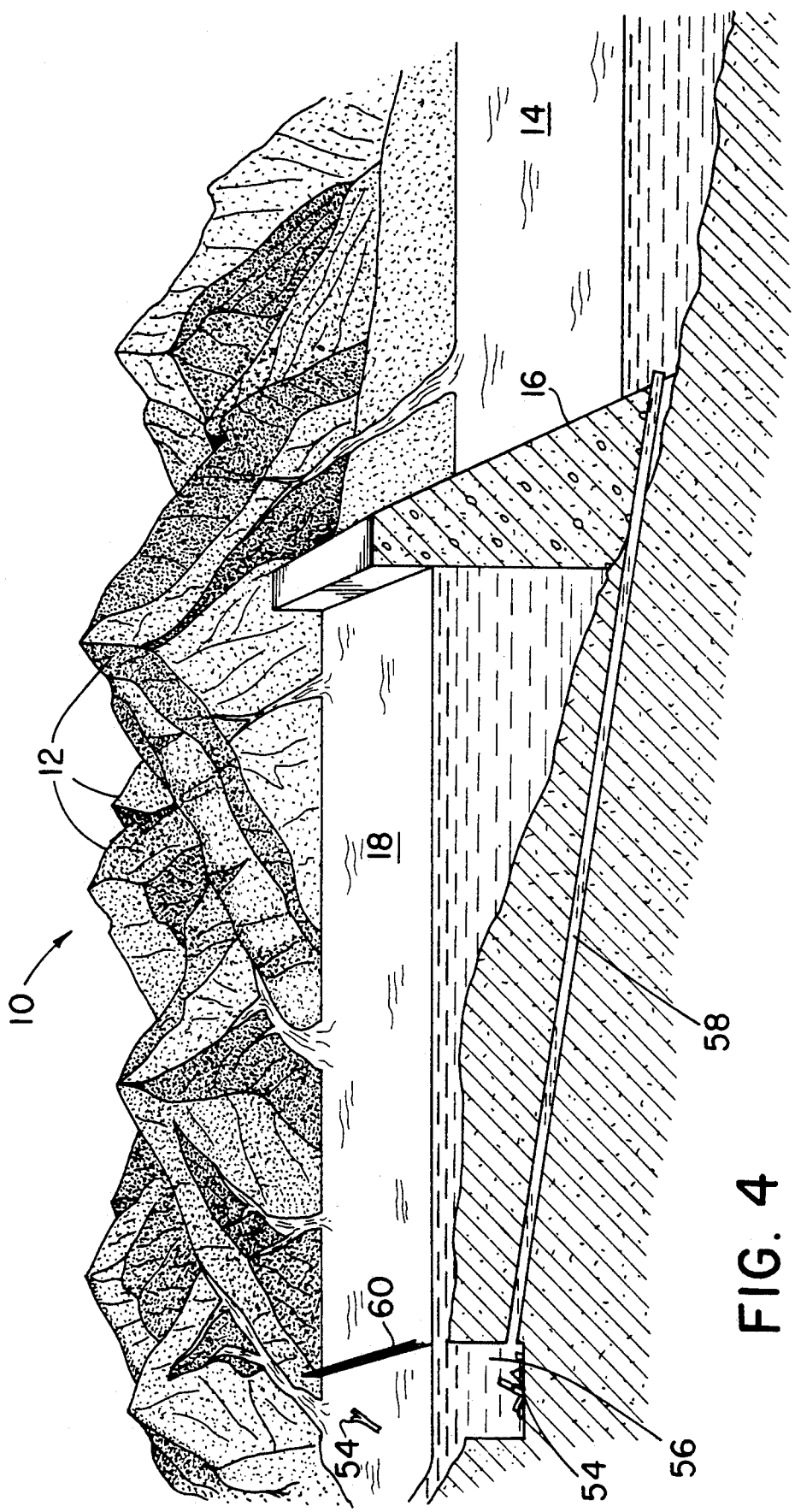
FIG. 4 is a perspective side detail view of the dam and river of the topographical model, shown substantially in cross section, and drawn to enlarged scale.

FIG. 4 shows an arrangement for keeping lake 18 free of debris 54, which may be submerged, or which may float. A trench or depression 56 formed at the beginning of lake 18 collects debris 54. Debris collected therein is periodically removed, and trench 56 can be drained through drain conduit 58. A screen 60 is optionally provided to guard against floating debris 54.

The topographic model 10 thus enables a relatively fixed amount of ice 30 to be placed in the chamber 26, and thus provide water to operate the model 10. Manipulating and observing the water flow among the various uses to which it is devoted enables students to understand the processes occurring, and to consider the economic choices inherent in a world with limited resources. It is to be understood that the present invention is not limited to the sole embodiment described above, but encompasses any and all embodiments within the scope of the following claims.

I claim:

1. A three dimensional topographical model having mountain simulating means, dam simulating means, and river simulating means including lake simulating means upstream of said dam simulating means, said mountain simulating means having:
   means defining an ice holding chamber therein having means defining at least one outlet open to the exterior of said mountain simulating means, whereby ice is placed in said ice holding chamber, melts, and escapes to the exterior of said mountain simulating means,
   means defining at least one stream bed thereon, discharging water from said ice holding chamber to one of said lake simulating means and said river simulating means,
   said river simulating means being adjacent said mountain simulating means, whereby said ice holding chamber is charged with ice and substantially fills with water when the ice melts, and the water flows out from said ice holding chamber into said at least one stream bed, and then into said river simulating means, whereby said model demonstrates water flow in a river originating with frozen water on a mountain.

2. The topographical model according to claim 1, said dam simulating means further including hydroelectric power simulating means.

3. The topographical model according to claim 1, said mountain simulating means including a first mountain side facing said river simulating means and a second mountain side facing away from said river simulating means, and said means defining at least one streambed including means defining a division of said at least one stream bed into at least two stream beds, whereby water flowing from said ice holding chamber flows into said river simulating means and away therefrom.

4. The topographical model according to claim 3, said mountain simulating means including water diversion means disposed to cause water to flow selectively into said at least two stream beds, whereby water level in said river simulating means is modulated.

5. The topographical model according to claim 4, there also being means simulating a cultivated field, and said mountain simulating means further including conduit means conducting water from said lake simulating means to said cultivated field simulating means whereby said topographical model demonstrates irrigation of a cultivated field.

6. The topographical model according to claim 3, there also being means simulating a cultivated field, and said mountain simulating means further including conduit means conducting water from said lake simulating means to said cultivated field simulating means, whereby said topographical model demonstrates irrigation of a cultivated field.

7. The topographical model according to claim 1, there also being means simulating a cultivated field, and said mountain simulating means further including conduit means conducting water from said lake simulating means to said cultivated field simulating means, whereby said topographical model demonstrates irrigation of a cultivated field.

8. The topographical model according to claim 7, said conduit means further including valve means, whereby flow of water to said cultivated field simulating means is selectively controlled.

9. The topographical model according to claim 1, there also being means for trapping and collecting debris flowing into said lake simulating means.

10. The topographical model according to claim 1, there also being secondary dam simulating means for retaining excess water flowing from said dam simulating means.

11. A three dimensional topographical model having upon an upper surface thereof mountain simulating means, dam simulating means, means simulating a cultivated field, and river simulating means including lake simulating means upstream of said dam simulating means, said mountain simulating means having:
   means defining an ice holding chamber therein having means defining at least one outlet open to the exterior of said mountain simulating means, whereby ice is placed in said ice holding chamber, melts, and escapes to the exterior of said mountain simulating means,
   means defining at least one stream bed thereon, discharging water from said ice holding chamber to one of said lake simulating means and said river simulating means,
   a first mountain side facing said river simulating means and a second mountain side facing away from said river simulating means, and means defining at least one stream bed including means defining a division of said at least one stream bed into at least two stream beds, there also being water diversion means disposed within said division to cause water to flow selectively into said at least two stream beds, whereby water level in said river simulating means is modulated,
   conduit means conducting water from said lake simulating means to said cultivated field simulating means, said conduit means further including valve means, whereby flow of water to said cultivated field is selectively controlled, said dam simulating means further including hydroelectric power simulating means, said dam simulating means, said river simulating means, and said cultivated field being adjacent said mountain simulating means, whereby said ice holding chamber is charged with ice and substantially fills with water when the ice melts, and the water flows out from said ice holding chamber into one of said at least two stream beds, and then into said river simulating means, and through said conduit means to said cultivated field, whereby said model demonstrates water flow in a river originating with frozen water on a mountain, and exploitation of water to generate hydroelectric power and to irrigate a cultivated field.

* * * * *